Jan. 23, 1923.
S. S. GRAVES.
CURRENT MOTOR.
FILED JUNE 25, 1921.
1,442,938
2 SHEETS-SHEET 1
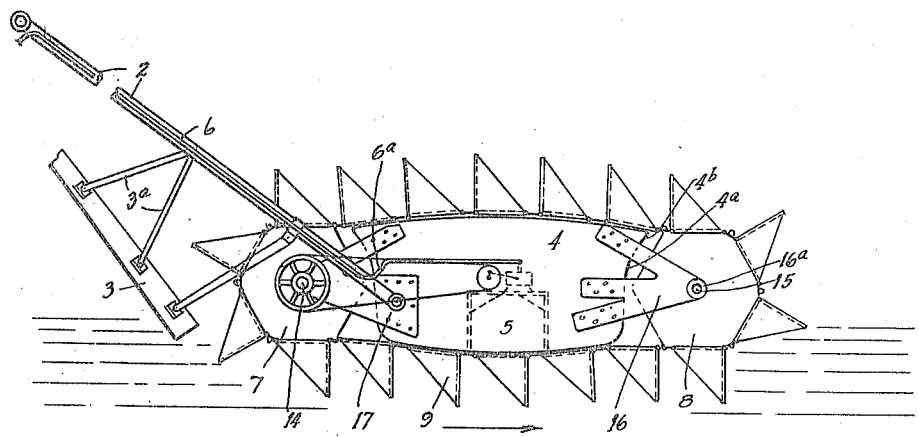
FIG. 1.
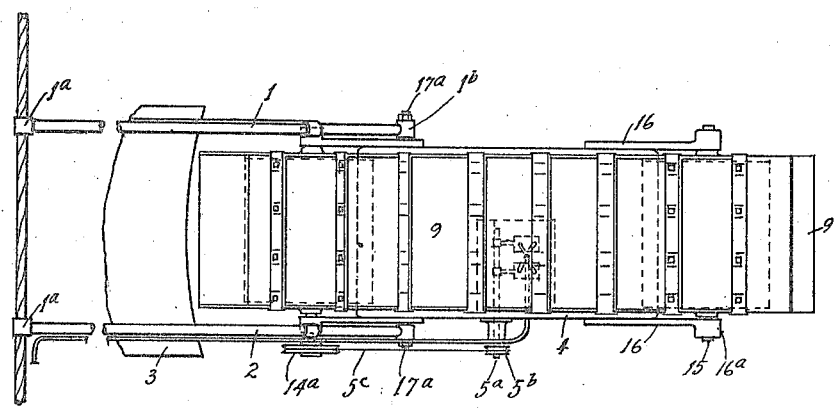
FIG. 2.
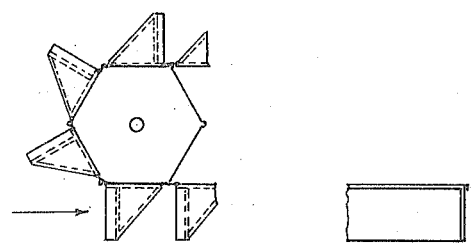
FIG. 5.   FIG. 6.
INVENTOR.
SCOTT S. GRAVES
BY 
ATTORNEYS.

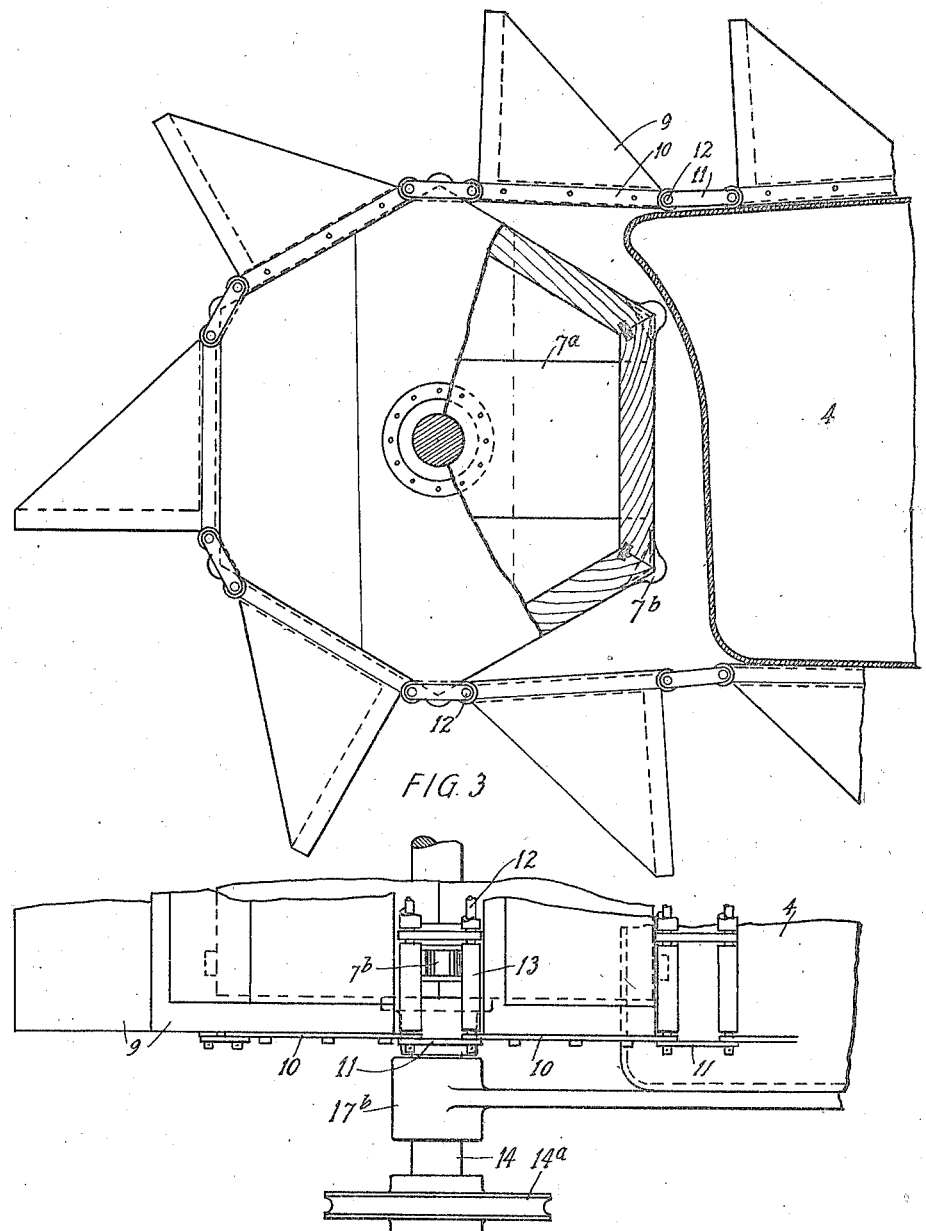

Patented Jan. 23, 1923.

1,442,938

UNITED STATES PATENT OFFICE.

SCOTT S. GRAVES, OF SAN DIEGO, CALIFORNIA.

CURRENT MOTOR.

Application filed June 25, 1921. Serial No. 480,417.

*To all whom it may concern:*

Be it known that I, SCOTT S. GRAVES, a citizen of the United States, residing at San Diego, in the county of San Diego and State of California, have invented a certain new and useful Current Motor, of which the following is a specification.

My invention relates to current motors, more particularly adapted for producing power from the water in running streams and the objects of my invention are: First, to provide a current motor which may be suspended on cables stretched across from bank to bank of a stream or upon a bridge or piles driven into the bed of a stream, the suspension members being on an angle to provide for raising and lowering of the surface of the water and the main portion of the motor floating in the current; second, to provide a current motor of this class which will not be materially affected by driftwood and the like floating in the current; third, to provide a current motor of this class in which the power producing medium is developed upon the float and conducted to the place desired for use; fourth, to provide a novelly constructed water propelled mechanism; fifth, to provide a current motor of this class which the variations of the height of the water, the rapidity of the current and general conditions relative to current motors of this class will not materially affect; sixth, to provide a current motor of this class with a fender for débris in the water which will tend to retard the current when the water is high and therefore swifter, thus automatically regulating the speed of the motor, and seventh, to provide a current motor of this class which is simple and economical of construction, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my current motor complete shown in operative position in the water showing its support fragmentarily. Fig. 2 is a top or plan view thereof. Fig. 3 is an enlarged detailed side elevational view of a portion thereof showing portions broken away and in section to facilitate the illustration. Fig. 4 is a fragmentary top view of the same with portions broken away to facilitate the illustrations. Fig. 5 is a fragmentary side elevational view of the water current operating mechanism in a slightly modified form from that of the other views of the drawings and Fig. 6 is a fragmentary side view of one of the paddle members.

Similar characters of reference refer to similar parts and portions throughout the several views of the drawings.

The supports 1 and 2, fender 3, supporting float 4, air compressor 5, air conductor 6, sprocket members 7 and 8, paddle members 9, links 10, links 11, rods 12, rollers 13, shafts 14, and 15 and supporting brackets 16 and 17 constitute the principal parts and portions of my current motor.

The supports 1 and 2 are preferably long bars provided with journals 1$^a$ at their upper ends adapted to be mounted upon a cable or other support so that the bars 1 and 2 pivot thereon or are mounted upon supports on a bridge or piles or otherwise as desired. The lower ends of these bars 1 are provided with journal members 1$^b$ which are pivotally mounted upon lugs 17$^a$ which lugs extend from the supporting brackets 17. These supporting brackets 17 are rigidly secured to the one end of the float 4 which is preferably shaped as shown best in Figs. 1, 2 and 3 of the drawings. This float 4 is provided with curved ends 4$^a$ and with outwardly extended portions 4$^b$ and with upward curve at the top and downward curve at the bottom which serve as supports for the paddle members and prevent whipping of the endless chain. Secured on the opposite end of the float from the supports 17 are supports 16, one on each side and each of these supports are provided with extended ends which are provided with journals 16$^a$ and 17$^b$ and mounted in the journals are the shafts 15 and 14 respectively. Secured to the shafts 14 and 15 are the sprocket members 7 and 8 which are preferably hollow members as shown best in Fig. 3 of the drawings and provided with cross supports 7$^a$ through which the axle is supported. These members 7 and 8 it will be noted are polygon shaped members preferably hexagon shaped and they are each provided at each corner with lugs 7ᵇ. It will be noted that there are several of these lugs on each corner spaced apart across the members 7 and 8. Mounted over these members 7 and 8 are a plurality of the paddle members 9 which are connected together by means of links 11 secured to the sides of said members, the links 11 forming the connecting links and holding them in certain spaced relation to each other thus forming an endless chain. This chain is supported on its upper side by the upper side of the float 4 and at the lower side by the lower side of the float 4. At the connections between the links 10 and 11 are rods 12 which extend from one end to the other of the member 9 and are connected in several places by means of the links 11. Revolubly mounted on these bars 12 between the links 10 are rollers 13 which are adapted to engage the sides of the lug members 7ᵇ and revolve the members 7 and 8 with the movement of the chain in the water. These paddle members 9 are preferably constructed in angle form with webs across the ends for supporting the two members rigidly. Secured to the supports 1 and 2 by means of strut members 3ª is the fender member 3 positioned on an angle to the surface of the water and extending to a position approximately even with the bottom of the float and the members 7 and 8 and in curved form as shown best in Fig. 3 of the drawings. It is preferably perforate and is for the purpose of deflecting the floating particles in the stream to the sides of, or under, the motor. Mounted in the float 4 is an air compressor 5 which is provided with an extended shaft 5ª provided with a sheave 5ᵇ thereon and mounted on said sheave 5ᵇ is a belt 5ᶜ which extends over a sheave 14ª on the extended end of the shaft 14 so that when the shaft 14 is revolved by the revolutions of the member 7 caused by the current of water on the paddles 9, the sheave 14ª will be revolved operating the air compressor. Extending from the air compressor is an air conductor 6 which is provided with a flexible portion 6ª therein adapted to permit slight movement with the movement of the float relatively to the supports 1 and 2. This conductor extends upwardly on the support 2 and then extends on the support for the supports 1 and 2 to any position desired, it being the object to connect it with an air tank for operating pneumatic tools.

In the modified form of construction shown in Figs. 5 and 6 of the drawings the paddle members are hollow and turned in the reverse direction, they being hollow so they will float tending to buoy the structure higher in the water and each is provided with extended web members at each side serving to prevent the water from too readily passing around the ends of the paddle members.

Though I have shown and described a particular construction, combination and arrangement of parts and portions and certain modifications, I do not wish to be limited to this particular construction, combination and arrangement, nor to the modifications, but desire to include in the purview of my invention the construction, combination and arrangement substantially as set forth in the appended claims.

It is obvious that with this construction there is provided a current motor which may be supported in the current in any stream of water such as a river or a creek, and a portion being adapted to float in the water. It is supported in suspended position by means of the supports 1 and 2, the upper ends of which are pivotally mounted upon the cable or other support and to the lower ends of which the float member is pivotally connected; that the float will rise and lower with the rising and lowering of the surface of the water to take care of the current motor in cases of swollen streams and the like; that the pressure on the bottom side of the chain formed by the paddles and their link connections will cause the members 7 and 8 to revolve and the member 7 supporting a drive wheel on its shaft will operate the air compressor supported on the float 4 which will compress air which may be conducted to any place desired for use, the fender 3 being curved will tend to deflect floating débris in the water so it will not strike against the paddles or motor and if it should do so will carry along with the paddle under the float and members 7 and 8 and be released at the opposite end.

Having thus described my invention what I claim as new and desire to secure by Letters Patent is:

1. A current motor, including a float, a buoyant sprocket member revolubly mounted at each end of said float, an endless chain provided with paddles extending outwardly mounted on said sprockets and adapted to ride over the top and bottom surfaces of said float.

2. A current motor, including a float, a buoyant sprocket member revolubly mounted at each end of said float, an endless chain provided with paddles extending outwardly and linked together mounted on said sprockets and adapted to ride over the top and bottom surfaces of said float, an air compressor mounted on said float operated by a shaft of one of said sprockets.

3. A current motor, including a float, a buoyant sprocket member revolubly mounted at each end of said float, an endless chain provided with paddles extending outwardly mounted on said sprockets and adapted to ride over the top and bottom surfaces of said float, an air compressor mounted on said float operated by a shaft of one of said sprockets and means pivotally mounted on said float and pivotally supported from above at its other end for supporting said float in the water.

4. A current motor, including a float, a buoyant sprocket member revolubly mounted at each end of said float, an endless chain provided with paddles extending outwardly mounted on said sprockets and adapted to ride over the top and bottom surfaces of said float, an air compressor mounted on said float operated by a shaft of one of said sprockets, means pivotally mounted on said float and pivotally supported from above at its other end for supporting said float in the water and a deflecting fender secured on said support adapted to deflect matter floating in the water from contacting with said current motor.

5. A current motor, including a float member, means for supporting it in suspended form, a buoyant sprocket member revolubly mounted on each end of said float, an endless chain provided with paddle members connected to said buoyant sprocket members and a drive shaft secured to one of said buoyant sprocket members.

6. A current motor, including a float member, means for supporting it in suspended form, a buoyant sprocket member revolubly mounted on each end of said float; an endless chain provided with paddle members connected to said buoyant sprocket members, a shaft secured to one of said buoyant sprocket members, and a power producing mechanism operative in connection with said shaft mounted on said float.

7. A current motor, including a float member, means for supporting it in suspended form, a buoyant sprocket member revolubly mounted on each end of said float, an endless chain provided with paddle members connected to said buoyant sprocket members, a shaft secured to one of said buoyant sprocket members, a power producing mechanism operative in connection with said shaft mounted on said float and a deflecting fender in connection with said float spaced apart above the same in the stream in the form of a curved member extending past the sides of said motor.

8. In a current motor, the combination of a number of endless chains spaced apart in parallel relation, each chain consisting of alternate long and short links; a paddle member rigidly secured to each set of parallel long links and buoyant revoluble means for supporting said endless chains.

In testimony whereof, I have hereunto set my hand at San Diego, California, this 20th day of June, 1921.

SCOTT S. GRAVES.